Figure 1:
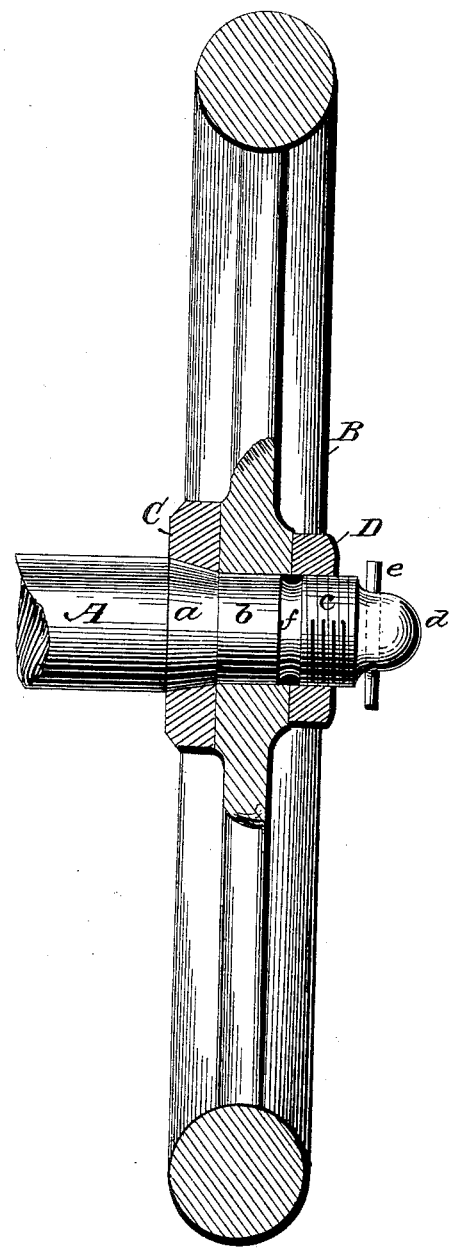

No. 706,265. Patented Aug. 5, 1902.
C. C. SMALLEY.
MEANS FOR SECURING WHEELS ON SHAFTS.
(Application filed June 2, 1902.)
(No Model.)

Witnesses
C. J. Williamson
M. E. Moore

Inventor
Clarence C. Smalley.
By Chas. H. Fowler
Attorney

THE NORRIS PETERS CO., PHOTO-LITHO., WASHINGTON, D. C.

UNITED STATES PATENT OFFICE.

CLARENCE C. SMALLEY, OF MANITOWOC, WISCONSIN.

MEANS FOR SECURING WHEELS ON SHAFTS.

SPECIFICATION forming part of Letters Patent No. 706,265, dated August 5, 1902.

Application filed June 2, 1902. Serial No. 109,851. (No model.)

*To all whom it may concern:*

Be it known that I, CLARENCE C. SMALLEY, a citizen of the United States, residing at Manitowoc, in the county of Manitowoc and State of Wisconsin, have invented certain new and useful Improvements in Rotatable Shafts and Means for Securing Fly-Wheels and other Similar Objects Thereto; and I do hereby declare that the following is a full, clear, and exact description of the same, reference being had to the annexed drawings, making a part of this specification, and to the letters of reference marked thereon.

The present invention has reference to that class of rotatable driving-shafts on which the pulley, fly-wheel, or other object is rigidly connected thereto, so that it will be carried around by the shaft, and means provided whereby the pulley, fly-wheel, or other object is immediately released, so that it will turn upon its bearing should any obstruction come in contact with the knives or other devices carried by the shaft.

The invention consists of a rotatable driving-shaft and means for connecting pulleys, fly-wheels, emery-wheels, or other objects thereto, substantially as shown in the drawings and hereinafter described and claimed.

Figure 2:
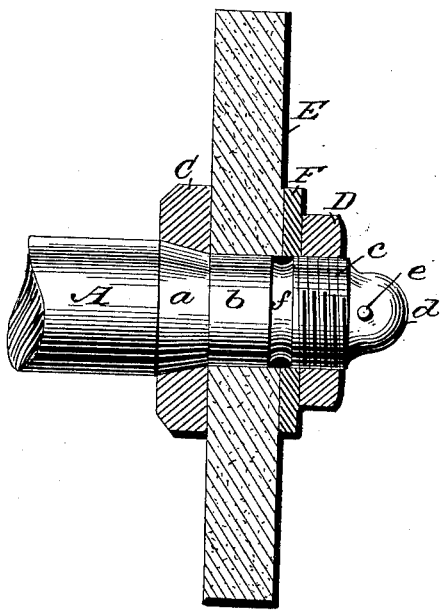

Figure 1 of the drawings is a side elevation of one end of a rotatable driving-shaft, showing a sectional view of a fly-wheel and means employed for holding it on the shaft; Fig. 2, a similar view showing the substitution of an emery-wheel in place of a fly-wheel.

In the accompanying drawings, A represents the end of a rotatable driving-shaft provided with a tapering bearing $a$ and an outwardly-extending cylindrical bearing $b$, whose circumference is equal throughout its length, said cylindrical bearing terminating in a screw-threaded extension $c$, with projection $d$ to receive a suitable key $e$.

In order to illustrate the practical use of my invention, I have shown a fly-wheel B of the usual construction; but any other object—such as a pulley, emery or other wheel—may be used in connection with the rotatable shaft.

The fly-wheel B is supported upon the cylindrical bearing $b$ and held thereon by a suitable collar C, which bears with frictional contact against the hub of the wheel, said collar having a tapering opening to correspond with the taper on the bearing with which the collar engages. Upon the opposite side of the hub of the fly-wheel to that of the collar C is a screw-threaded nut D, which engages a screw-threaded extension $c$ and bears with frictional contact with the hub of the fly-wheel. A circumferential groove $f$ is formed between the cylindrical bearing $b$ and the screw-threaded extension $c$, which divides the two and presents less frictional surface to the screw-threaded opening in the nut and also less bearing-surface to the bore of the hub, thereby rendering the nut more sensitive to the outer bearing-surface of the hub against the nut when the fly-wheel is reversed in its rotary motion. To retain the nut D on the screw-threaded extension $c$, I provide a suitable key $e$, which engages the projection $d$, or any other suitable means may be provided for retaining the nut thereon as found best adapted to the purpose.

The rotatable shaft may be adapted for use in machinery, such as feed-cutters, wherein the cutting-knives for cutting the feed are rigidly connected to the rotatable shaft, a pulley being used at the opposite end of the shaft to that of the fly-wheel and connected thereto in the same manner, the two ends of the shaft being constructed alike, but the screw-threads running in opposite directions, or, in other words, a right-and-left screw-thread upon the opposite ends of the shaft.

It will be noticed that the bore in the hub of the fly-wheel or other object is not tapering, for the reason that the bearing therefor is not required to be tapering, but in place thereof a bearing that is of the same diameter throughout its length, as shown at $b$. This will enable the peculiar construction of the shaft with both its tapering bearing $a$ and its bearing $b$ to be adapted to fly-wheels and pulleys or to emery-wheels or any other similar objects where the tapering bearing would not be required, and I have shown in Fig. 2 of the drawings the application of the shaft to an emery-wheel, as indicated at E, an additional means of fastening being employed in the form of a washer F, of any suitable material, which bears with frictional contact against the side of the emery-wheel. This is to show that the shaft may take the place of the ordinary rotary shaft where a pulley or fly-wheel is not required, such as in feed-cutters or other like farm machinery.

When any obstruction comes in contact with the knives or any other like object upon the rotatable shaft when the same is in motion, a sudden jar upon the shaft will necessarily follow, which would result in momentarily stopping the velocity of the shaft and cause fly-wheel to turn in its opposite direction, which will loosen the nut D and remove its frictional bearing from the hub of the fly-wheel and allow the same to loosely turn independent of the shaft, the collar C on the tapering bearing $a$ compelling the fly-wheel to move in an outward direction and directing its pressure against the nut.

Having now fully described my invention, what I claim as new, and desire to secure by Letters Patent, is—

1. The combination with a wheel, of a rotatable shaft having a tapering bearing, a cylindrical bearing of equal diameter throughout its length and terminating in a screw-threaded extension, a collar engaging the tapering bearing and a screw-nut engaging the screw-threaded extension, said collar and nut providing means for holding the wheel upon the shaft, substantially as and for the purpose described.

2. A rotatable driving-shaft having a tapering bearing, an outwardly-extending cylindrical bearing terminating in a screw-threaded extension having a projection thereon, a key engaging therewith, a wheel supported upon the cylindrical bearing, a collar upon the tapering bearing, and a nut engaging the screw-threaded extension, substantially as and for the purpose set forth.

In testimony that I claim the above I have hereunto subscribed my name in the presence of two witnesses.

CLARENCE C. SMALLEY.

Witnesses:
A. L. NASH,
JOSEPH HEJDA.